US 12,072,755 B2

United States Patent
Roman et al.

(10) Patent No.: US 12,072,755 B2
(45) Date of Patent: Aug. 27, 2024

(54) OPTIMIZED LOW POWER MODE FOR NFC/RFID SYSTEMS

(71) Applicant: STMicroelectronics (Rousset) SAS, Rousset (FR)

(72) Inventors: Denis Roman, Villeneuve-Loubet (FR); Jean-Louis Demessine, Saint-Jeannet (FR); Lionel Chastillon, Valbonne (FR); Renaud Lemonnier, Antibes (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 40 days.

(21) Appl. No.: 17/951,631

(22) Filed: Sep. 23, 2022

(65) Prior Publication Data

US 2023/0133688 A1    May 4, 2023

(30) Foreign Application Priority Data

Oct. 28, 2021   (FR) ...................... 2111452

(51) Int. Cl.
  *G06F 1/32* (2019.01)
  *G06F 1/3296* (2019.01)
  *H04B 5/77* (2024.01)

(52) U.S. Cl.
  CPC ............. *G06F 1/3296* (2013.01); *H04B 5/77* (2024.01)

(58) Field of Classification Search
  CPC .... G06F 1/3296; G06F 1/1698; G06F 1/3209; G06F 1/3293; G06F 1/263; H04B 5/0062; H04B 5/0037; H02J 50/20; H04W 4/80; H04W 52/0229; H04W 52/028; G06K 19/0701; G06K 19/0708; G06K 19/0712; G06K 19/0723
  See application file for complete search history.

(56) References Cited

U.S. PATENT DOCUMENTS

| | | | |
|---|---|---|---|
| 9,477,292 B1 * | 10/2016 | Murali | H04W 52/0235 |
| 10,811,308 B2 * | 10/2020 | Liu | H01L 21/02002 |
| 2004/0124249 A1 * | 7/2004 | Komatsu | G06K 19/0712 235/492 |
| 2008/0143487 A1 | 6/2008 | Hulvey | |
| 2010/0238002 A1 | 9/2010 | Ryan et al. | |
| 2011/0156640 A1 | 6/2011 | Moshfeghi | |
| 2011/0187544 A1 | 8/2011 | Ross et al. | |
| 2014/0062668 A1 | 3/2014 | Gudan et al. | |
| 2014/0368050 A1 * | 12/2014 | Chun | H02J 50/40 307/104 |
| 2015/0069136 A1 | 3/2015 | Wu et al. | |

(Continued)

FOREIGN PATENT DOCUMENTS

| CN | 102436597 A | 5/2012 |
|---|---|---|
| CN | 102742294 A | 10/2012 |

(Continued)

*Primary Examiner* — Nitin C Patel
(74) *Attorney, Agent, or Firm* — Slater Matsil, LLP (57) ABSTRACT

The present description concerns an electronic device having an antenna configured to receive a radio frequency signal. The electronic device further includes a control unit. The control unit is off, and the antenna receives a radio frequency signal. The antenna is configured to deliver a first voltage representative of the radio frequency signal to power the control unit with the voltage for the duration of the booting of the control unit.

20 Claims, 3 Drawing Sheets

(56) References Cited

U.S. PATENT DOCUMENTS

| | | | |
|---|---|---|---|
| 2017/0090537 A1* | 3/2017 | Elad | ............... H02J 50/80 |
| 2018/0034507 A1 | 2/2018 | Wobak et al. | |
| 2018/0049126 A1 | 2/2018 | Cheng | |
| 2018/0309328 A1* | 10/2018 | Hwang | ............... H02J 50/12 |
| 2019/0104473 A1* | 4/2019 | Chun | ............... H04W 52/0235 |

FOREIGN PATENT DOCUMENTS

| | | |
|---|---|---|
| CN | 202486816 U | 10/2012 |
| CN | 103413166 A | 11/2013 |
| CN | 106557803 A | 4/2017 |
| CN | 107682048 A | 2/2018 |
| CN | 110110838 A | 8/2019 |
| EP | 2597779 A1 | 5/2013 |
| EP | 3285524 A1 | 2/2018 |

* cited by examiner

Unless specified otherwise, the expressions "around," "approximately," "substantially," and "in the order of" signify within 10% and preferably within 5%.

Figure 1:
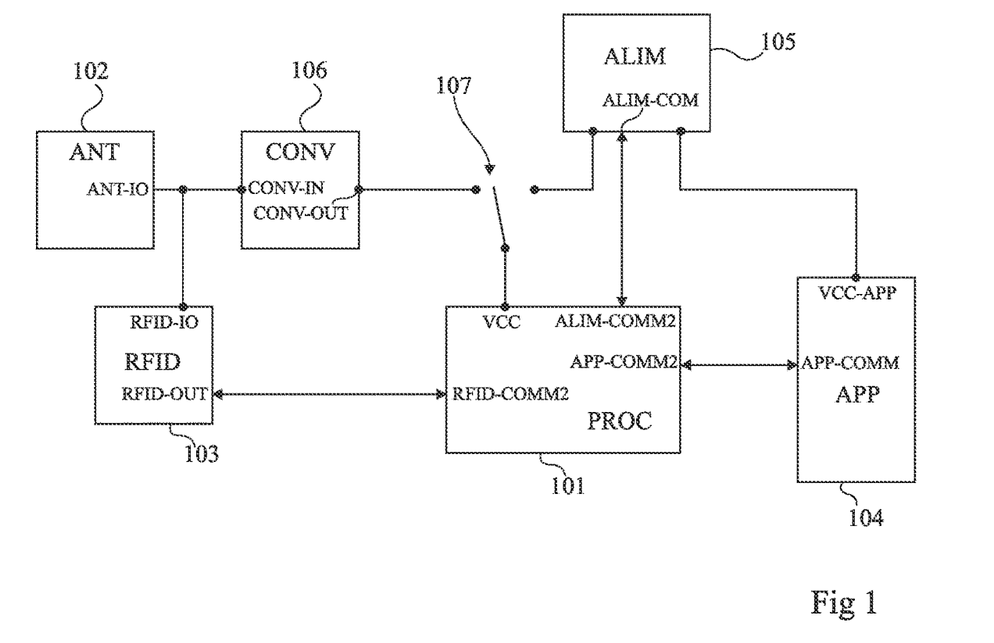

FIG. 1 is a very schematic and simplified block diagram of an embodiment of an electronic device 100.

Electronic device 100 includes a control unit 101 (PROC) adapted to implement different operations and functions of electronic device 100. According to an embodiment, the control unit 101 is a processor, a microprocessor, or a microcontroller. According to an embodiment, the control unit 101 is a monostable circuit or simply monostable in the rest of the description.

In an embodiment, a monostable circuit continuously delivers an output voltage at a first level, for example, at a low level, and which, on the reception of a control pulse, modifies the value of its output voltage to a second level, for example, a high level, for a determined period, before changing back its output voltage to the first level.

Control unit 101 includes at least one power supply terminal VCC on which control unit 101 is adapted to receive a power supply voltage. Control unit 101 further includes a reference terminal, not shown in FIG. 1, on which control unit 101 is adapted to receive a reference voltage, for example, the ground. Control unit 101 further includes a plurality of communication terminals enabling control unit 101 to communicate with other elements of device 100. These communication terminals are detailed hereafter, along with the description of the other elements of electronic device 100.

Electronic device 100 includes an antenna 102 (ANT) adapted to receive and emit radio frequency signals. In embodiments, the radio frequency signal is a signal with a frequency ranging from 3 kHz to 300 GHz; these signals are currently used for radio communication.

Antenna 102 includes at least one output terminal, ANT-IO adapted to deliver a voltage representative of a radio frequency signal received by antenna 102. Output terminal ANT-IO may in practice be formed of two electric nodes delivering potentials having as a difference the voltage representative of the radio frequency signal received by antenna 102.

Electronic device 100 further optionally includes a wireless communication circuit 103 (RFID). According to an example, circuit 103 may be a circuit adapted to wireless radio frequency communication or radio frequency identification (RFID), or more particularly, to wireless near field communication (NFC). Circuit 103 includes at least one RFID-IO input terminal coupled, for example, connected, to the output terminal ANT-IO of antenna 102, and at least one communication terminal RFID-COMM coupled to a communication terminal RFID-COMM2 of control unit 101. According to an example, circuit 103 communicates with control unit 101 by using an electronic bus of I2C (Inter-Integrated Circuit) type. According to an example, circuit 103 does not need to be powered, receiving the voltage delivered by antenna 102 is sufficient for its operation. According to a variant, circuit 103 has a power supply terminal.

Electronic device 100 further optionally includes one or a plurality of circuits 104 for implementing applications of device 100. A single circuit 104 is shown in FIG. 1. Circuit 104 may be a measurement circuit, a sensor, a display circuit, a cipher circuit, etc. Each circuit 104 includes at least one power supply terminal VCCAPP on which circuit 104 is adapted to receive a power supply voltage. Each circuit 104 further includes a reference terminal, not shown in FIG. 1, on which circuit 104 is adapted to receive a reference voltage, for example, the ground. Each circuit 104 further includes a communication terminal APP-COMM coupled, for example, connected, to a communication terminal APP-COMM2 of control unit 101.

Electronic device 100 further includes means for powering control unit 101 and circuit(s) 104. These power supply means include a power supply circuit 105, a conversion circuit 106, and selection means 107.

Power supply circuit 105 is adapted to power the elements of electronic device 100. More particularly, power supply circuit 105 is adapted to deliver a power supply voltage or a plurality of different power supply voltages to the elements. In FIG. 1, circuit 105 is adapted to deliver a first power supply voltage to control unit 101, and a second power supply voltage to circuit 104. Power supply circuit 105 may further be adapted to communicate with control unit 101, and may thus include at least one communication terminal ALIM-COMM coupled, for example, connected, to a communication terminal ALIM-COMM2 of control unit 101. According to another embodiment, power supply circuit 105 does not communicate with control unit 101.

Conversion circuit 106 is adapted to convert the voltage representative of a radio frequency signal received by antenna 102 into a voltage adapted to power control unit 101. According to an example, the voltage adapted to power control unit 101 is a rectified AC voltage, or even a DC voltage. Conversion circuit 106 includes an input terminal CONV-IN receiving the output voltage of antenna 102 and an output terminal CONV-OUT delivering the voltage adapted to power control unit 101.

Selection means 107 enable control unit 101 to select a power supply source. In particular, selection means 107 enables the control unit to select whether its power supply terminal VCC receives a power supply voltage originating from power supply circuit 105, or a power supply voltage originating from conversion circuit 106. According to an example, selection means 107 is a selector controlled by control unit 101. According to another example, selection means 107 is internal to control unit 101.

According to an embodiment, control unit 101 is adapted to implement a plurality of operating modes. In a first operating mode, or an active mode, control unit 101 operates at full power and is adapted to control all the elements of electronic device 100. In a second operating mode, a standby mode, or a low-consumption mode, control unit 101 is off, and may be booted at any time if antenna 102 receives a radio frequency signal. In other words, during a standby mode, the control unit receives no power supply voltage. The power supply method implemented on reception of a radio frequency signal by antenna 102 is described in relation with FIG. 2.

Figure 2:
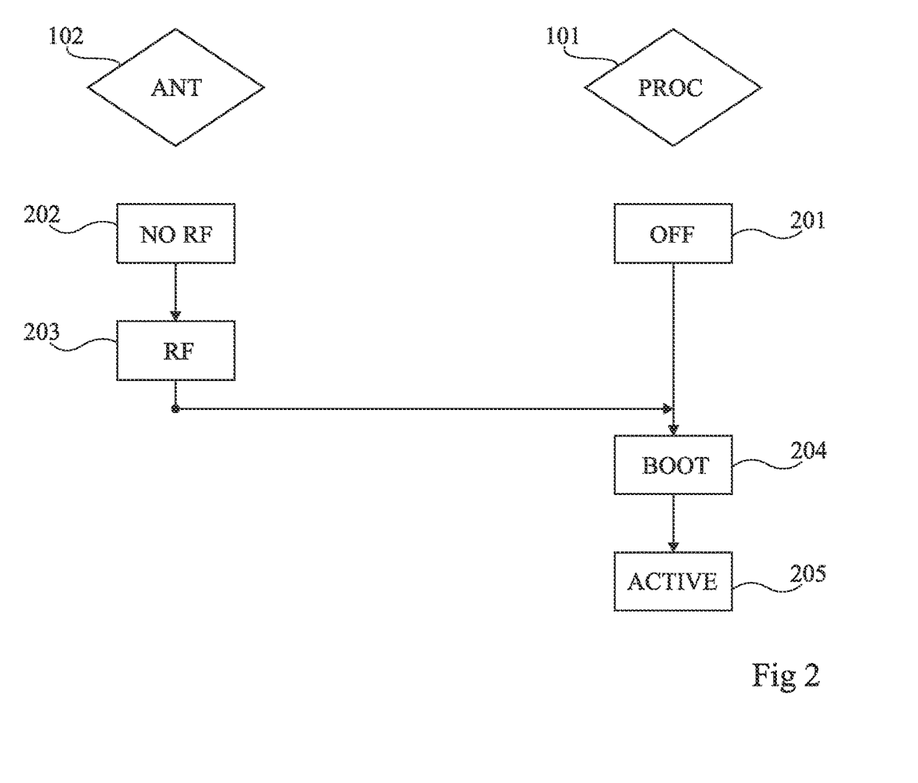

FIG. 2 is a block diagram illustrating a method of powering the control unit 101 of the device 100 described in relation with FIG. 1, when the control unit is in a standby mode, and antenna 102 receives a radio frequency signal.

At the beginning of the power supply method, control unit 101 is in an initial state 201, shown by a block "OFF," where control unit 101 is off, that is, is not powered. As for antenna 102, it is also in an initial state 202, shown by a block "NO RF," where antenna 102 has not received a radio frequency signal yet. It can also be said that, during states 201 and 202, electronic device 100 is in a standby mode. No function of electronic device 100 is implemented. According to an example, power supply circuit 105 is functional but is not used when control unit 101 is off.

At a state 203, shown by a block "RF," subsequent to initial state 202, antenna 102 receives a radio frequency signal. Antenna 102 converts this signal into a voltage representative of the radio frequency signal. This voltage is transmitted to conversion circuit 106, which then generates a power supply voltage adapted to power control unit 101. This voltage may further be sent to wireless communication circuit 103, which processes this voltage, for example, so as to supply circuit 103 with energy.

According to an embodiment, once conversion circuit 106 generates a power supply voltage and since control unit 101 is off, selection means 107 deliver the power supply voltage of conversion circuit 106 to the power supply terminal VCC of control unit 101.

Control unit 101 then enters a boot state 204, represented by a block "BOOT". During state 204, the control unit performs all the operations necessary for its booting, such as a soft start, and the booting of its internal circuits and components, the booting of power supply circuit 105, but also, optionally, for the booting of the other elements of electronic device 100, such as that of application circuit(s) 104. More particularly, the operations necessary to the booting of the control unit include the booting of its internal clocks, of its communication units, the booting of its internal software or program, etc.

Once the booting of control unit 101 is over, control unit 101 switches to a state 205, shown by a block "ACTIVE," where control unit 101 is in an active mode. Selection means 107 no longer deliver the power supply voltage originating from conversion circuit 106, but deliver a power supply voltage originating from power supply circuit 105, which is now booted.

In other words, during its boot phase, control unit 101 is powered by conversion circuit 106, and once its boot phase is over, control unit 101 is powered by power supply circuit 105.

Control unit 101 remains in active mode as long as necessary, whether antenna 102 receives a radio frequency signal or not. If antenna 102 no longer receives a radio frequency signal, control unit 101 chooses whether it continues to be in an active mode or whether it switches to standby mode.

An advantage of this embodiment is that, during a standby mode, control unit 101 consumes no energy since it is not powered and thus off. Indeed, electronic devices generally have a low-consumption mode where they consume less energy than in their active consumption mode. During this low-consumption mode, the control unit remains "on alert" to be able to process a radio frequency signal, or more generally, any event capable of causing its booting, and for this purpose it needs to be always powered, but generally with a lower power. This is not the case with device 100.

Figure 3:
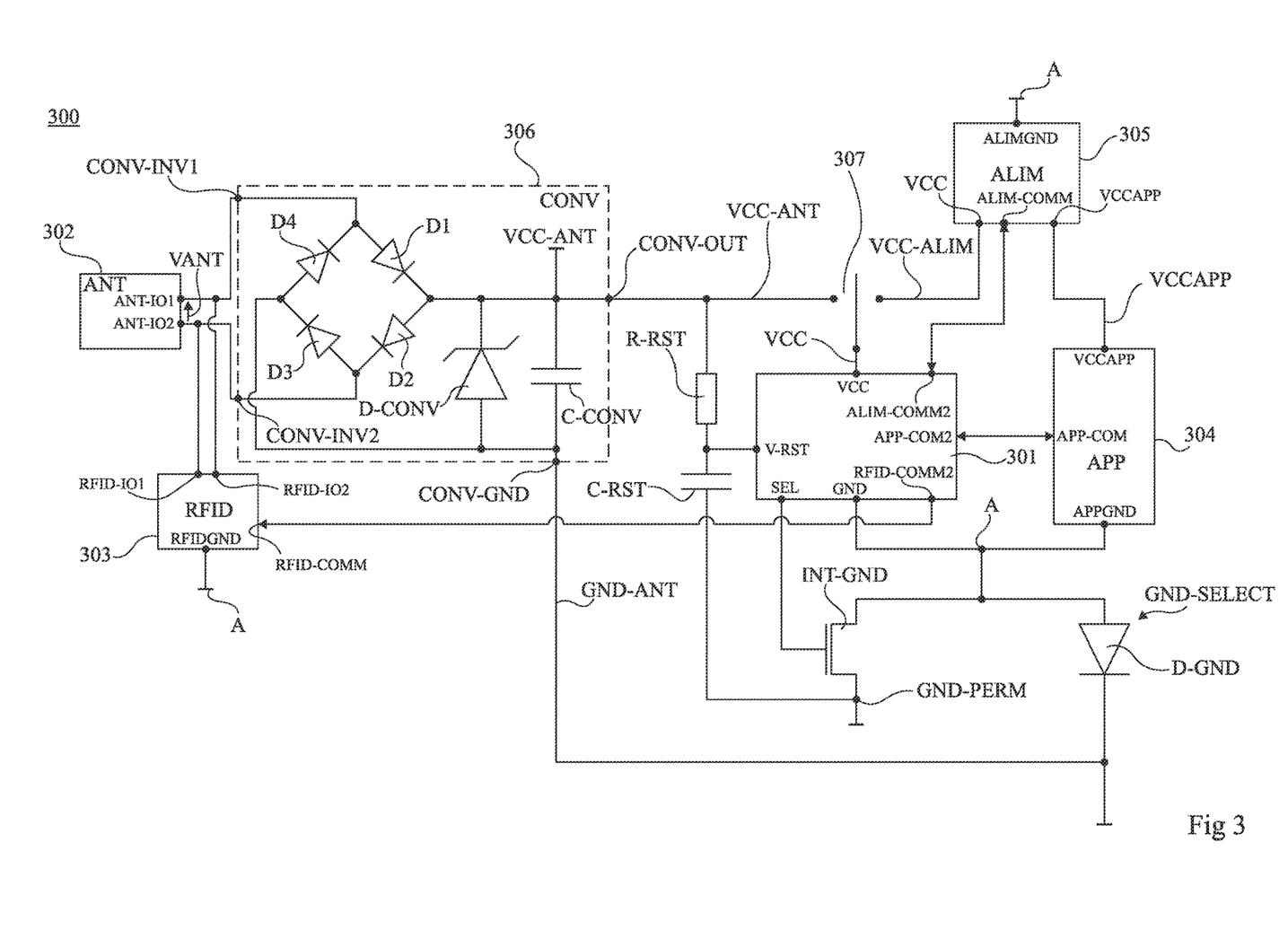

FIG. 3 is an electric diagram, partially in the form of blocks, of an example of embodiment of an electronic device 300 of the type of the electronic device 100 described in relation with FIG. 1.

Like electronic device 100, electronic device 300 includes: a control unit 301 (PROC) of the type of the control unit 101 of FIG. 1; an antenna 302 (ANT) of the type of the antenna 102 of FIG. 1; an optional wireless communication circuit 303 (RFID), of the type of the wireless communication circuit 103 of FIG. 1; one or a plurality of optional circuits 304 (APP) of implementation of applications of device 300, of the type of the circuit(s) 104 of FIG. 1; a power supply circuit 305 (ALIM), of the type of the power supply circuit 105 of FIG. 1; a conversion circuit 306 (CONV) of the type of the conversion circuit 106 of FIG. 1; and selection means 307, of the type of the selection means 107 of FIG. 1.

In FIG. 3, control unit 301 includes: a power supply terminal VCC coupled, for example, connected, to selection means 307 and receiving a power supply potential VCC; a terminal GND on which control unit 301 receives a reference potential GND, for example, the ground; three communication terminals ALIM-COMM2, APP-COMM2, and RFID-COMM2 coupled, for example, connected, respectively to power supply circuit 305, to circuit 306, and to circuit 303; a reset terminal N_RST enabling to control a booting or a rebooting, or a resetting, of control unit 101.

Antenna 302 includes two terminals ANT-IO1 and ANT-IO2, each delivering a potential. The potential difference of terminals ANT-IO1 and ANT-IO2 is a voltage VANT representative of a radio frequency signal received by antenna 302.

Wireless communication circuit 303 includes two terminals RFID-IO1 and RFID-IO2 coupled, for example, connected, respectively, to terminals ANT-IO1 and ANT-IO2 of antenna 302. Circuit 303 further includes a terminal RFIDGND receiving a reference potential, for example, the ground, and a communication terminal RFID-COMM coupled, for example, connected to the terminal RFID-COMM2 of control unit 101.

In FIG. 3, circuit 304 of implementation of applications includes: a communication terminal APP-COMM coupled, for example, connected, to the communication terminal APP-COMM2 of control unit 301; a power supply terminal VCAPP receiving a power supply potential VCCAPP from power supply circuit 305; and a terminal APPGND receiving a reference potential, for example, the ground.

In FIG. 3, power supply circuit 305 includes: a power supply terminal VCC delivering power supply potential VCC; a power supply terminal VCCAPP delivering power supply potential VCCAPP; a terminal ALIMGND receiving a reference potential, for example, the ground; and a communication terminal ALIM-COMM coupled, for example, connected, to the communication terminal ALIM-COMM2 of control unit 302.

According to an example, power supply potentials VCC and VCCAPP are identical.

In the example of FIG. 3, conversion circuit 306 includes two input terminals CONV-IN1 and CONV-IN2 coupled, for example, respectively connected, to the terminals ANT-IO1 and ANT-IO2 of antenna 302; an output terminal CONV-OUT delivering a power supply potential VCC-ANT; and a terminal delivering a reference potential GND-ANT.

According to an example of embodiment, circuit 306 includes three elements coupled in parallel between terminals CONV-OUT and CONV-GND. Circuit 306 more particularly, includes a voltage rectifying diode bridge receiving as an input voltage VANT, and delivering as an output the power supply voltage being the difference of potential VCC-ANT and of potential GND-ANT corresponding to rectified voltage VCCANT. The diode bridge is formed of four diodes D1, D2, D3, and D4. According to an example, the anode of diode D1 is coupled, preferably connected, to terminal CONV-IN1, and the cathode of diode D1 is coupled, preferably connected, to terminal CONV-OUT. The anode of diode D2 is coupled, preferably connected, to terminal CONV-OUT, and the cathode of diode D2 is coupled, preferably connected, to terminal CONV-IN2. The anode of diode D3 is coupled, preferably connected, to terminal CONV-IN2, and the cathode of diode D3 is coupled, preferably connected, to terminal CONV-GND. The anode of diode D34 is coupled, preferably connected, to terminal CONV-GND, and the cathode of diode D4 is coupled, preferably connected, to terminal CONV-IN1. Circuit 306 further includes a diode D-CONV, for example, a Zener diode, having its anode coupled, preferably connected, to terminal CONV-GND, and its cathode coupled, preferably connected, to terminal CONV-OUT. Circuit 306 further includes a capacitor C-CONN having a first electrode coupled, preferably connected, to terminal CONV-GND, and its second electrode is coupled, preferably connected, to terminal CONV-OUT.

Electronic device 300 further includes an RC-type circuit enabling to protect the reset terminal N-RST of control unit 301. This circuit includes a resistor R-RST and a capacitor C-RST. A first terminal of resistor R-RST is coupled, preferably connected, to the terminal CONV-OUT of conversion circuit 306, and a second terminal of resistor R-RST is coupled, preferably connected, to the terminal N-RST of control unit 301. A first electrode of capacitor C-RST is coupled, preferably connected, to the terminal N-RST of control unit 301, and a second electrode of capacitor C-RST receives a reference potential GND-PERM.

Electronic device 300 further includes a selection circuit GND-SELECT adapted to select the reference potential applied to the different elements of device 300. Indeed, since the main power supply source of device 300, and more particularly of control unit 301, is modifiable, the reference potential also is. Selection circuit GND-SELECT includes an input node A coupled to terminals GND of control unit 301, APPGND of circuit 304, ALIM-GND of circuit 305, and RFID-GND of circuit 303. Selection circuit GND-SELECT is adapted to deliver either the reference potential GND-ANT delivered by conversion circuit 306 on its terminal CONV-GND, or reference potential GND-PERM.

Selection circuit GND-SELECT includes a switch INT-GND, for example, a transistor of N-channel MOS type. Call MOS-type transistor an insulated gate field effect transistor, more currently called MOSFET (Metal Oxide Semiconductor Field Effect Transistor). Switch INT-GND includes a first terminal, corresponding to a first conduction terminal of the transistor, coupled, preferably connected, to node A, and a second terminal, corresponding to a second conduction terminal of the transistor, coupled, preferably connected, to a node delivering reference potential GND-PERM. The control node of switch INT-GND, corresponding to the transistor gate, is coupled, preferably connected, to the terminal SEL of control unit 301.

Selection circuit GND-SELECT further includes a diode D-GND having its anode coupled, preferably connected, to node A, and having its cathode coupled, preferably connected, to the terminal CONV-GND of conversion circuit 306. According to an alternative embodiment, diode D-GND may be replaced with a switch of the type of switch INT-GND. According to another alternative embodiment, diode D-GND may be replaced with a switch controlled by the presence or not of a radio frequency field.

When control unit 301 is powered by power supply circuit 305, then switch INT-GND is conductive, and node A delivers potential GND-PERM, otherwise switch INT-GND is off, and node A delivers potential CONV-GND.

Figure 4:
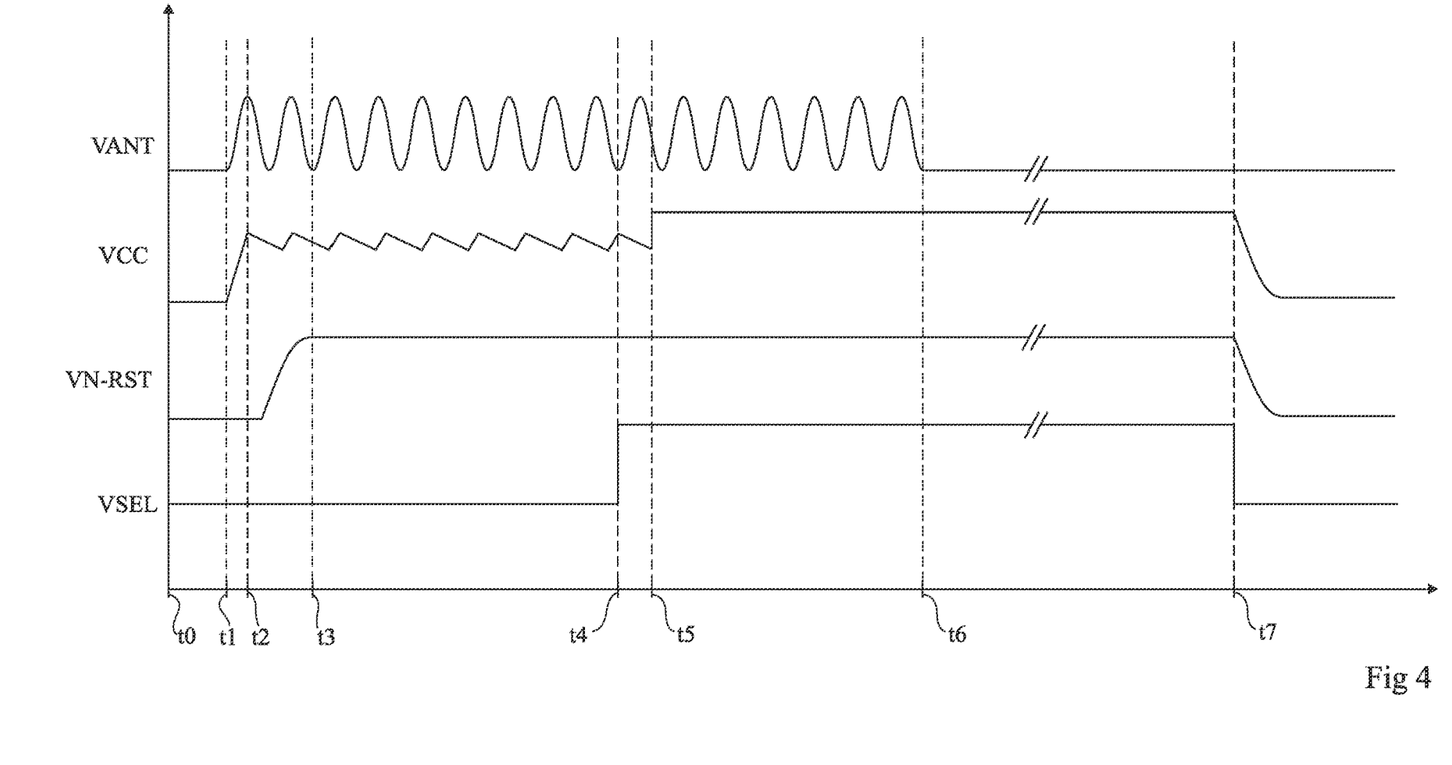

The application of the power supply method described in relation with FIG. 2 is described in further detail for device 300 in relation with FIG. 4.

FIG. 4 illustrates timing diagrams of voltages of electronic device 300 during the power supply method described in relation with FIG. 2. In other words, these timing diagrams illustrate the passage of control unit 301 from a standby mode where it is not powered to an active mode on reception of a radio frequency signal by antenna 302.

FIG. 4 more particularly illustrates the time variation: of the output voltage VANT of antenna 302; of a power supply voltage VCC received by control unit 301 on its power supply terminal VCC; of a voltage VN_RST being the difference between the potential at the level of terminal N-RST of control unit 301 and potential GND-PERM; and of a voltage VSEL being the difference between the potential at the level of terminal SEL of control unit 301 and potential GND-PERM.

At an initial time t0, all voltages are in a low state or reference state. In other words, antenna 302 receives no radio frequency signal, and conversion circuit 306 receives no voltage to be converted. The booting of control unit 301 is not requested by its reset terminal N_RST since control unit 301 is not powered. Selection circuit GND-SELECT selects potential GND-PERM as being the reference potential of the elements of device 100.

At a time t1, subsequent to time t0, antenna 302 receives a radio frequency signal. Voltage VANT then switches from its low state, corresponding to a difference of two substantially equal potentials, to an oscillating state representative of the radio frequency signal received by antenna 302. Conversion circuit 306 receives voltage VANT and starts its conversion. For this purpose, and until a time t2, subsequent to time t1, voltage VCC is the voltage VCCANT delivered by conversion circuit 306 and increases, for example, substantially linearly.

At time t2, voltage VCC, and thus voltage VCCANT, has reached its maximum amplitude, and is then equal to the rectified voltage VANT. Voltage VCCANT is then sufficiently high to power control unit 301, and to have the voltage VN-RST at the reset terminal N-RST of control unit 301 increase.

At a time t3, subsequent to time t2, voltage VN-RST is at a high level. In other words, the reset terminal N-RST of control unit 301 is activated, and control unit 301 can start its booting.

At a time t4, subsequent to time t3, control unit 301 has ended its booting. As described in relation with FIG. 2, control unit 301 is then capable of modifying its power supply source for power supply circuit 305. Since the power supply source is modified, selection circuit GND-SELECT modifies the reference potential of the elements of device 300. For this purpose, control unit 301 switches voltage VSEL to a high state, different from its low state.

At a time t5 subsequent to time t4, voltage VCC is the voltage VCC-ALIM delivered by power supply circuit 305. Thus, from time t5, voltage VCC is a stable voltage, or even a DC voltage.

At a time t6, subsequent to time t5, antenna 302 no longer receives a radio frequency signal, and no longer delivers a voltage. Thus, voltage VANT switches back to its low state. According to an example of embodiment, control unit 301 here decides to keep on operating and not to stop. It will be within the abilities of those skilled in the aft to imagine different embodiments.

At a time t7, subsequent to time t6, control unit 301 has finished the operations that it should implement, and device 300 can be turned off. All the elements of device 300 are stopped, and voltages VCC, VN-RST, and VSEL are set back to their low state.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:

1. An electronic device, comprising:
a control unit;
a power supply circuit configured to generate a first supply voltage;
an antenna configured to:
receive a radio frequency signal when the control unit is in an OFF state, and
transmit a first voltage to the control unit to power the control unit by a second supply voltage for a duration of a booting sequence of the control unit, the first voltage being a representative of the radio frequency signal; and
a conversion circuit coupled to the antenna and the control unit, the conversion circuit comprising:
a voltage rectifying diode bridge configured to convert the first voltage from AC to DC, the voltage rectifying diode bridge having a first output terminal and a second output terminal, wherein the second supply voltage equals a potential difference between the first output terminal and the second output terminal, a potential at the second output terminal being at a first reference potential,
a first diode having an anode terminal coupled to the first output terminal, a cathode terminal of the first diode coupled to the second output terminal, and
a capacitor having a first terminal coupled to the first output terminal, a second terminal of the capacitor coupled to the second output terminal.

2. The electronic device of claim 1, wherein the control unit is a processor, a microprocessor, or a microcontroller.

3. The electronic device of claim 1, wherein the control unit is configured to be powered by the first supply voltage after completion of the booting sequence, the power supply circuit having a first terminal and a second terminal, the first supply voltage being equal to a potential difference between the first terminal and the second terminal of the power supply circuit.

4. The electronic device of claim 3, wherein the electronic device comprises a selection circuit configured to select a reference potential between the first reference potential and a second reference potential at the second terminal of the power supply circuit, the selected reference potential being applied to components of the electronic device.

5. The electronic device of claim 4, wherein the selection circuit is configured to:
select the first reference potential in response to the control unit being powered by the second supply voltage; and
select the second reference potential in response to the control unit being powered by the power supply circuit, the second reference potential being different than the first reference potential.

6. The electronic device of claim 1, wherein the first supply voltage is a direct current (DC) voltage.

7. The electronic device of claim 1, wherein the control unit is configured to be in an OFF state when the control unit is not being used.

8. The electronic device of claim 1, wherein the booting sequence comprises a soft start of the control unit, a booting of clock systems of the control unit, and a booting of communication circuits of the control unit.

9. The electronic device of claim 1, wherein the control unit is a monostable circuit.

10. The electronic device of claim 1, wherein the electronic device further includes a communication circuit configured for wireless communication.

11. The electronic device of claim 10, wherein the communication circuit is configured for near field communication (NFC).

12. The electronic device of claim 4, wherein the selection circuit comprises:
a switch having a control terminal coupled to the control unit, a first conduction terminal of the switch coupled to a shared reference node between the control unit and the power supply circuit, the shared reference node having the second reference potential; and
a second diode having an anode terminal coupled to the shared reference node, a cathode terminal of the second diode coupled to a second output terminal of the conversion circuit,
wherein the switch is configured to select between the first reference potential and the second reference potential based on the control unit being powered ON by the first supply voltage or the second supply voltage.

13. A method comprising, comprising:
receiving, by an antenna of an electronic device, a radio frequency signal when a control unit of the electronic device is in an OFF state;
generating, by a converting circuit, a first supply voltage by converting a first voltage representative of the radio frequency signal from AC to DC, the converting circuit comprising a voltage rectifying diode bridge having a first output terminal and a second output terminal, the first supply voltage being equal to a potential difference between the first output terminal and the second output terminal, a potential at the second output terminal being at a first reference potential, the conversion circuit further comprising a first diode having an anode terminal coupled to the first output terminal, a cathode terminal of the first diode coupled to the second output terminal, and the conversion circuit further comprising a capacitor having a first terminal coupled to the first output terminal, a second terminal of the capacitor coupled to the second output terminal;
transmitting, by the conversion circuit, the first supply voltage to the control unit; and
powering the control unit by the first supply voltage for a duration of a booting sequence of the control unit.

14. The method of claim 13, further comprising powering the control unit using a second supply voltage from a power supply circuit of the electronic device after completion of the booting sequence, the power supply circuit having a first terminal and a second terminal, the second supply voltage being equal to a potential difference between the first terminal and the second terminal of the power supply circuit.

15. The method of claim 14, further comprising selecting, by a selection circuit of the electronic device, a reference potential between the first reference potential and a second reference potential at the second terminal of the power supply circuit, the selected reference potential being applied to components of the electronic device.

16. The method of claim 15, further comprising:
selecting, by the selection circuit, the first reference potential in response to the control unit being powered by the first supply voltage; and
selecting, by the selection circuit, the second reference potential in response to the control unit being powered by the power supply circuit, the second reference potential being different than the first reference potential.

17. An electronic device, comprising:
an antenna configured to receive a radio frequency signal;
a power supply circuit configured to generate a first supply voltage;
a control unit configured to be powered ON in a first mode and a second mode,
  wherein in the first mode, the control unit is powered OFF when the antenna is receiving the radio frequency signal and the control unit is powered ON in response to the antenna transmitting a first voltage representative of the radio frequency signal to the control unit to power ON the control unit by a second supply voltage during a boot sequence of the control unit, and
  wherein in the second mode, the control unit is powered ON by the first supply voltage from the power supply circuit after completion of the boot sequence of the control unit; and
a selection circuit configured to:
  select a first node having a first reference potential for the second supply voltage in response to the control unit being powered ON in the first mode, and
  select a second node having a second reference potential for the first supply voltage in response to the control unit being powered ON in the second mode.

18. The electronic device of claim 17, wherein in a third mode, the electronic device is in a low-power mode, and wherein the selection circuit selects the first node having the first reference potential in the low-power mode.

19. The electronic device of claim 17, further comprising a conversion circuit, the conversion circuit comprising:
  a voltage rectifying diode bridge configured to convert the first voltage from AC to DC, the voltage rectifying diode bridge having a first output terminal and a second output terminal, wherein the second supply voltage equals a potential difference between the first output terminal and the second output terminal, the potential at the second output terminal being the first reference potential;
  a first diode having an anode terminal coupled to the first output terminal, a cathode terminal of the first diode coupled to the second output terminal; and
  a capacitor having a first terminal coupled to the first output terminal, a second terminal of the capacitor coupled to the second output terminal.

20. The electronic device of claim 19, wherein the selection circuit comprises:
  a switch having a control terminal coupled to the control unit, a first conduction terminal of the switch coupled to a shared reference node between the control unit and the power supply circuit, the shared reference node having the second reference potential; and
  a second diode having an anode terminal coupled to the shared reference node, a cathode terminal of the second diode coupled to a second output terminal of the conversion circuit,
  wherein the switch is configured to select between the first node and the second node based on the control unit being powered ON in the first mode or the second mode.

* * * * *